US010240100B2

(12) United States Patent
Mezger et al.

(10) Patent No.: US 10,240,100 B2
(45) Date of Patent: Mar. 26, 2019

(54) CORROSION INHIBITORS FOR FUELS AND LUBRICANTS

(71) Applicant: BASF SE, Ludwigshafen (DE)

(72) Inventors: Jochen Mezger, Lautersheim (DE); Maxim Peretolchin, Lambrecht (DE); Aaron Flores-Figueroa, Mannheim (DE); Markus Hansch, Speyer (DE); Ludwig Voelkel, Limburgerhof (DE); Ivette Garcia Castro, Ludwigshafen (DE); Klaus Muehlbach, Gruenstadt (DE); Harald Boehnke, Mannheim (DE)

(73) Assignee: BASF SE, Ludwigshafen (DE)

( * ) Notice: Subject to any disclaimer, the term of this patent is extended or adjusted under 35 U.S.C. 154(b) by 47 days.

(21) Appl. No.: 15/115,587

(22) PCT Filed: Jan. 29, 2015

(86) PCT No.: PCT/EP2015/051825
§ 371 (c)(1),
(2) Date: Jul. 29, 2016

(87) PCT Pub. No.: WO2015/114053
PCT Pub. Date: Aug. 6, 2015

(65) Prior Publication Data
US 2017/0066986 A1 Mar. 9, 2017

(30) Foreign Application Priority Data

Jan. 29, 2014 (EP) ..................................... 14152991
Dec. 4, 2014 (WO) .................. PCT/EP2014/076622
Dec. 16, 2014 (EP) ..................................... 14198266

(51) Int. Cl.
| | |
|---|---|
| *C10L 1/196* | (2006.01) |
| *C10L 10/04* | (2006.01) |
| *C10M 129/72* | (2006.01) |
| *C10M 129/92* | (2006.01) |
| *C10L 1/188* | (2006.01) |
| *C10M 129/34* | (2006.01) |
| *C10M 145/12* | (2006.01) |
| *C10M 145/16* | (2006.01) |
| *C10M 159/00* | (2006.01) |
| *C10M 171/00* | (2006.01) |
| *C10L 1/14* | (2006.01) |
| *C10L 1/16* | (2006.01) |
| *C10L 10/18* | (2006.01) |
| *C10L 10/06* | (2006.01) |
| *C08F 210/14* | (2006.01) |
| *C08F 222/06* | (2006.01) |
| *C10L 1/197* | (2006.01) |
| *C10L 1/236* | (2006.01) |

(52) U.S. Cl.
CPC ............ *C10L 10/04* (2013.01); *C08F 210/14* (2013.01); *C08F 222/06* (2013.01); *C10L 1/146* (2013.01); *C10L 1/1641* (2013.01); *C10L 1/188* (2013.01); *C10L 1/1883* (2013.01); *C10L 1/1963* (2013.01); *C10L 1/1966* (2013.01); *C10L 1/1973* (2013.01); *C10L 1/1976* (2013.01); *C10L 10/06* (2013.01); *C10L 10/18* (2013.01); *C10M 129/34* (2013.01); *C10M 129/72* (2013.01); *C10M 129/92* (2013.01); *C10M 145/12* (2013.01); *C10M 145/16* (2013.01); *C10M 159/005* (2013.01); *C10M 171/00* (2013.01); *C10L 1/2362* (2013.01); *C10L 1/2364* (2013.01); *C10L 1/2366* (2013.01); *C10L 1/2368* (2013.01); *C10L 2230/22* (2013.01); *C10L 2270/023* (2013.01); *C10L 2270/026* (2013.01); *C10M 2205/028* (2013.01); *C10M 2207/123* (2013.01); *C10M 2209/084* (2013.01); *C10M 2209/086* (2013.01); *C10M 2217/022* (2013.01); *C10M 2217/024* (2013.01); *C10M 2217/026* (2013.01); *C10M 2217/028* (2013.01); *C10N 2230/04* (2013.01); *C10N 2230/12* (2013.01); *C10N 2230/54* (2013.01); *C10N 2240/103* (2013.01); *C10N 2240/104* (2013.01); *C10N 2260/00* (2013.01)

(58) Field of Classification Search
CPC combination set(s) only.
See application file for complete search history.

(56) References Cited

U.S. PATENT DOCUMENTS

| | | | |
|---|---|---|---|
| 3,382,056 A | 5/1968 | Enver Mehmedbasich | |
| 4,491,455 A | 1/1985 | Ishizaki et al. | |
| 4,877,416 A | 10/1989 | Campbell | |
| 4,959,077 A | 9/1990 | Martischius et al. | |
| 5,080,686 A | 1/1992 | Garrecht et al. | |
| 6,743,266 B2 | 6/2004 | Derosa | |
| 2002/0026028 A1* | 2/2002 | Epple .................... | C08G 63/00 528/73 |
| 2013/0227878 A1 | 9/2013 | Wolf et al. | |

FOREIGN PATENT DOCUMENTS

| | | |
|---|---|---|
| DE | 38 26 608 A1 | 2/1990 |
| DE | 38 38 918 A1 | 5/1990 |

(Continued)

OTHER PUBLICATIONS

International Search Report and Written Opinion of the International Searching Authority dated Mar. 18, 2015 in PCT/EP2015/051825 filed Jan. 29, 2015 (with English translation of the International Search Report only).

(Continued)

Primary Examiner — Ellen M McAvoy
Assistant Examiner — Chantel L Graham
(74) Attorney, Agent, or Firm — Oblon, McClelland, Maier & Neustadt, L.L.P.

(57) ABSTRACT

The present invention relates to novel uses of corrosion inhibitors in fuels and lubricants.

15 Claims, 1 Drawing Sheet

(56) References Cited

FOREIGN PATENT DOCUMENTS

| | | |
|---|---|---|
| DE | 41 42 241 A1 | 6/1993 |
| DE | 43 09 074 A1 | 9/1994 |
| DE | 196 20 262 A1 | 11/1997 |
| DE | 101 02 913 A1 | 7/2002 |
| EP | 0 061 895 A2 | 10/1982 |
| EP | 0 244 616 A2 | 11/1987 |
| EP | 0 261 957 A2 | 3/1988 |
| EP | 0 299 120 A1 | 1/1989 |
| EP | 0 307 815 A1 | 3/1989 |
| EP | 0 310 875 A1 | 4/1989 |
| EP | 0 356 725 A1 | 3/1990 |
| EP | 0 452 328 A1 | 10/1991 |
| EP | 0 476 485 A1 | 3/1992 |
| EP | 0 548 617 A2 | 6/1993 |
| EP | 0 639 632 A1 | 2/1995 |
| EP | 0 700 985 A1 | 3/1996 |
| EP | 0 831 141 A1 | 3/1998 |
| EP | 3 099 768 A1 | 12/2016 |
| JP | 55-85679 A | 6/1980 |
| WO | WO 87/01126 A1 | 2/1987 |
| WO | WO 93/18115 A1 | 9/1993 |
| WO | WO 94/24231 A1 | 10/1994 |
| WO | WO 96/03367 A1 | 2/1996 |
| WO | WO 96/03479 A1 | 2/1996 |
| WO | WO 97/03946 A1 | 2/1997 |
| WO | WO 98/04656 A1 | 2/1998 |
| WO | WO 99/29748 A1 | 6/1999 |
| WO | WO 00/44857 A2 | 8/2000 |
| WO | WO 00/47698 A1 | 8/2000 |
| WO | WO 2004/035715 A1 | 4/2004 |
| WO | WO 2005/054314 A2 | 6/2005 |
| WO | WO 2013/101256 A2 | 7/2013 |

OTHER PUBLICATIONS

International Preliminary Report on Patentability dated Apr. 19, 2016 in PCT/EP2015/051825 filed Jan. 29, 2015 (with English translation).

B. Müller, et al., "Polymeric Corrosion Inhibitors for Copper and Brass Pigments" Journal of Applied Polymer Science, vol. 80, No. 3, XP055174158, Jan. 1, 2001, pp. 475-483.

U.S. Appl. No. 15/115,150, filed Jul. 28, 2016, Jochen Mezger, et al.

\* cited by examiner

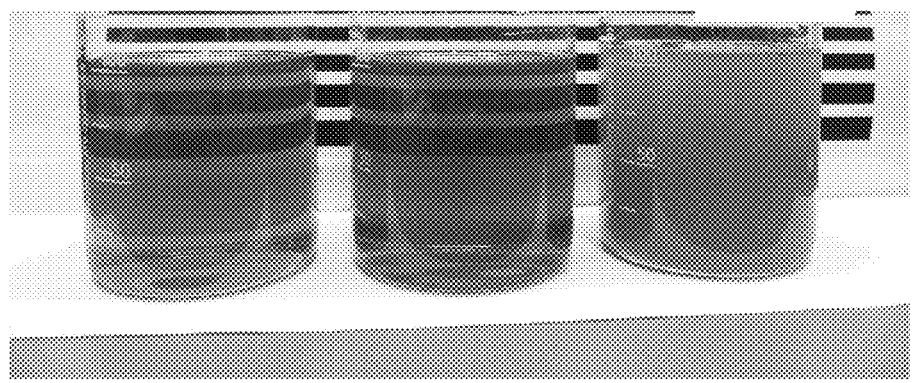

CORROSION INHIBITORS FOR FUELS AND LUBRICANTS

CROSS REFERENCE TO RELATED APPLICATION

This application is a 371 of PCT/EP2015/051825, filed on Jan. 29, 2015, and claims priority to European Patent Application No. 14152991.7, filed on Jan. 29, 2014; International Patent Application No. PCT/EP2014/076622, filed on Dec. 4, 2014; and European Patent Application No. 14198266.0, filed on Dec. 16, 2014.

Description

The present invention relates to novel uses of corrosion inhibitors in fuels and lubricants.

Corrosion inhibitors are standard additives in fuels and lubricants, which are often based on structures containing acid groups, for example dimer fatty acids.

A disadvantage of these corrosion inhibitors is that they have a tendency to precipitate, especially in the presence of calcium ions, as a result of which their corrosion-inhibiting action is reduced. The deposits formed as a result of this precipitation can additionally impair the working of engines, engine constituents or parts of the fuel system, especially the injection system, specifically the injection pumps or nozzles.

The "injection system" is understood to mean the part of the fuel system in motor vehicles from the fuel pump up to and including the injector outlet. "Fuel system" is understood to mean the components of motor vehicles that are in contact with the particular fuel, preferably the region from the tank up to and including the injector outlet.

In one embodiment of the present invention, the inventive compounds counteract deposits not just in the injection system but also in the rest of the fuel system, here especially deposits in fuel filters and pumps.

The problem addressed was therefore that of providing corrosion inhibitors which exhibit increased compatibility with calcium ions and good stability in fuel additive packages, and at the same time retain their action as a corrosion inhibitor.

The problem is solved by the use according to the claims.

U.S. Pat. No. 3,382,056 teaches the use of low molecular weight copolymers comprising olefins and succinic acid and derivatives thereof in copolymerized form as anti-rust additives in refined fuel compositions.

JP 55-085679 teaches the use of hydrolytically opened copolymers of molar mass Mw from 2000 to 30 000 formed from α-olefins having 20 to 60 carbon atoms and maleic anhydride as oil-soluble rust inhibitors in mineral oil or lubricants.

U.S. Pat. No. 5,080,686 and EP 299120 disclose that alkyl- and alkenylsuccinic acids and derivatives thereof and copolymers comprising olefins and succinic acid and derivatives thereof in copolymerized form function as corrosion inhibitors in oxygenated fuel systems.

It is not apparent from any of these documents that the inventive corrosion inhibitors have elevated compatibility with calcium ions.

Accordingly, the invention provides for the use of polymers having a statistical average of
  at least 4 acid groups per polymer chain,
  a ratio of carbon atoms per acid group of 7 to 35 and
  an acid number of 80 to 320 mg KOH/g, determined by
    potentiographic titration with 0.5 molar aqueous hydrochloric acid after heating in 0.5 molar ethanolic potassium hydroxide solution for three hours
as corrosion inhibitors in fuels or lubricants, preferably in fuels, more preferably in fuels having a content of alkali metals and/or alkaline earth metals and/or zinc of at least 0.1 ppm by weight.

The polymers according to the present invention may be homopolymers or copolymers, preferably copolymers.

The polymers may be obtained by any desired methods, preferably by polyaddition or polycondensation, preferably by polyaddition. The polyaddition can preferably be effected by free-radical or ionic means, preferably free-radical means.

The polymers described are found to be particularly advantageous in fuels and lubricants, particularly in fuels, having a content of alkali metals and/or alkaline earth metals and/or zinc of at least 0.1 ppm by weight, more preferably at least 0.2 ppm by weight, even more preferably at least 0.3 ppm by weight and especially at least 0.5 ppm by weight.

It is an advantage of the polymers described that they also exhibit their corrosion-inhibiting action in the presence of alkali metals and/or alkaline earth metals and/or zinc, preferably also in the presence of alkaline earth metals. The content of alkali metals and/or alkaline earth metals in fuels results, for example, from mixing with lubricants containing alkali metals and/or alkaline earth metals, for example in the fuel pump. In addition, alkali metals and/or alkaline earth metals may originate from non-desalinated or inadequately desalinated fuel additives, for example carrier oils. The entrainment of alkali metals and/or alkaline earth metals into the fuels can cause the abovementioned disadvantages. One example of a zinc source is antiwear additives.

Alkali metals include particularly sodium and potassium, especially sodium.

Alkaline earth metals include particularly magnesium and calcium, especially calcium.

Zinc should also be emphasized.

Particularly advantageously, the polymers described are still active even in the presence of calcium and do not exhibit any precipitation.

The stated amounts of alkali metals and/or alkaline earth metals and/or zinc each relate to individual metal species.

Description of the Polymers

The polymers for the use of the invention are regular, random or block polymers having a statistical average of
  at least 4 acid groups per polymer chain,
  a ratio of carbon atoms per acid group of 7 to 35 and
  an acid number of 80 to 320 mg KOH/g, determined by
    potentiographic titration with 0.5 molar aqueous hydrochloric acid after heating in 0.5 molar ethanolic potassium hydroxide solution for three hours.

Polymers of this kind have been found to be effective corrosion inhibitors having good solubility in fuels.

Preferably, the polymers of the invention have a solubility in toluene at 20° C. of at least 0.5 g/100 mL, more preferably of at least 1 g/100 mL, even more preferably of at least 2 g/100 mL, particularly of at least 3 g/100 mL and especially of at least 5 g/100 mL.

In the case of homopolymers, the polymers have more than four, preferably more than five, more preferably more than eight and most preferably more than ten repeat units of the parent monomers, and in the case of copolymers more than two repeat units of each parent monomer, preferably more than three, more preferably more than four and most preferably more than five.

The acid groups are, for example, carboxyl groups, sulfonic acid groups or phosphonic acid groups, preferably carboxyl groups.

The number of acid groups per polymer chain is, on statistical average, preferably at least 5, more preferably at least 6, even more preferably at least 7 and especially at least 8 acid groups per polymer chain.

The upper limit in the number of acid groups per polymer chain is, on statistical average, preferably 50, more preferably 40, even more preferably 30 and especially 26 acid groups per polymer chain.

The polymer may, as well as hydrocarbon units and acid groups, have further functional groups, for example oxygen-containing functional groups, preferably carbonate groups, ether groups or ester groups, or nitrogen-containing functional groups, preferably urea groups, urethane groups, amino groups or amide groups.

Oxygen-containing functional groups refer here to those functional groups comprising no other heteroatoms than oxygen atoms.

Nitrogen-containing functional groups refer here to those functional groups comprising no other heteroatoms than nitrogen atoms and optionally oxygen atoms.

Preferably, the polymers comprise not more than 5, more preferably not more than 4, even more preferably not more than 3, particularly not more than 2 and especially not more than one functional group other than oxygen-containing functional groups and nitrogen-containing functional groups per polymer chain.

Preferably, the polymers comprise not more than 5, more preferably not more than 4, even more preferably not more than 3, particularly not more than 2 and especially not more than one nitrogen-containing functional group per polymer chain other than amino groups, urea groups, urethane groups or amide groups.

In a particularly preferred embodiment, the polymers comprise not more than 2 amino groups, even more preferably not more than 1 amino group and especially zero amino groups per polymer chain.

In a further particularly preferred embodiment, the polymers comprise not more than 10, even more preferably not more than 8, particularly not more than 6 and especially not more than four urea, urethane or amide groups per polymer chain.

Preferably, the polymers comprise not more than 4, more preferably not more than 3, even more preferably not more than 2, particularly not more than 1 and especially no oxygen-containing functional group per polymer chain other than carbonate groups, ether groups or ester groups.

The number of carbonate, ether and/or ester groups per polymer chain, particularly of ester groups per polymer chain, is less relevant in accordance with the invention, provided that there is simultaneous compliance with the required ratio of carbon atoms per acid group.

In a preferred embodiment, the polymers comprise not more than 20, more preferably not more than 15, especially preferably not more than 10 and particularly not more than 5 ether groups per polymer chain.

In a further preferred embodiment, the polymers comprise not more than 50, more preferably not more than 40, especially preferably not more than 30 and particularly not more than 26 carbonate or ester groups per polymer chain.

In a further, likewise preferred embodiment, the polymers comprise not more than 4, more preferably not more than 3, especially preferably not more than 2, particularly not more than 1 and especially zero carbonate and ester groups per polymer chain.

The ratio of carbon atoms in the polymer per acid group is defined as the total number of carbon atoms per polymer chain divided by the acid groups per polymer chain on statistical average. Both parameters can be determined from the monomers used and the molecular weight ascertained by gel permeation chromatography (with tetrahydrofuran and polystyrene as standard), and from the monomers used in the polymerization.

The lower limit in the ratio of carbon atoms in the polymer per acid group is preferably at least 8, more preferably at least 9, even more preferably at least 10, particularly at least 11 and especially at least 12.

The upper limit in the ratio of carbon atoms in the polymer per acid group is preferably up to 33, more preferably up to 31, even more preferably up to 29, particularly up to 27 and especially up to 25.

The specified ratio of carbon atoms in the polymer per acid group results firstly in good solubility in fuels, and secondly in sufficient availability of carboxyl groups for the corrosion-inhibiting effect.

The polymers additionally have an acid number of 80 to 320, preferably of 90 to 300 and more preferably of 95 to 290 mg KOH/g, determined by potentiographic titration with 0.5 molar aqueous hydrochloric acid after heating in 0.5 molar ethanolic potassium hydroxide solution for three hours.

The polymer generally has a weight-average molecular weight Mw of 0.5 to 20 kDa, preferably 0.6 to 15, more preferably 0.7 to 7, even more preferably 1 to 7 and especially 1.5 to 5 kDa (determined by gel permeation chromatography with tetrahydrofuran and polystyrene as standard).

The number-average molecular weight Mn is usually from 0.5 to 10 kDa, preferably 0.6 to 5, more preferably 0.7 to 4, even more preferably 0.8 to 3 and especially 1 to 2 kDa (determined by gel permeation chromatography with tetrahydrofuran and polystyrene as standard).

In a preferred embodiment, the polymers comprise a high proportion of adjacent carboxylic acid groups, which is determined by a measurement of adjacency. For this purpose, a sample of the polymer is heat-treated between two Teflon films at a temperature of 290° C. for a period of 30 minutes and an FTIR spectrum is recorded at a bubble-free site. The IR spectrum of Teflon is subtracted from the spectra obtained, the layer thickness is determined and the content of cyclic anhydride is determined.

In a preferred embodiment, the adjacency is at least 10%, preferably at least 15%, more preferably at least 20%, even more preferably at least 25% and especially at least 30%.

Use

The inventive use relates to the inhibition of corrosion of iron, steel and/or nonferrous metal surfaces.

Among the nonferrous metals, preference is given to copper and alloys thereof.

More preferably, the corrosion of steel surfaces is inhibited.

The polymers described are added to fuels having the above-specified content of alkali metals and/or alkaline earth metals and/or zinc, generally in amounts of 1 to 60 and preferably 10 to 40 ppm by weight.

Frequently, the polymers described are used in the form of fuel additive mixtures, together with customary additives:

In the case of diesel fuels, these are primarily customary detergent additives, carrier oils, cold flow improvers, lubricity improvers, corrosion inhibitors other than the polymers described, demulsifiers, dehazers, antifoams, cetane number improvers, combustion improvers, antioxidants or stabilizers, antistats, metallocenes, metal deactivators, dyes and/or solvents.

Accordingly, the invention further provides for the use of polymers having a statistical average of
at least 4 acid groups per polymer chain,
a ratio of carbon atoms per acid group of 7 to 35 and
an acid number of 80 to 320 mg KOH/g, determined by potentiographic titration with 0.5 molar aqueous hydrochloric acid after heating in 0.5 molar ethanolic potassium hydroxide solution for three hours,
in additive packages comprising at least one additive selected from the group consisting of detergent additives, carrier oils, cold flow improvers, lubricity improvers, corrosion inhibitors other than the polymers described, demulsifiers, dehazers, antifoams, cetane number improvers, combustion improvers, antioxidants, stabilizers, antistats, metallocenes, metal deactivators, dyes and solvents, for reducing corrosion in diesel fuels having a content of alkali metals and/or alkaline earth metals and/or zinc of at least 0.1 ppm.

In the case of gasoline fuels, these are in particular lubricity improvers (friction modifiers), corrosion inhibitors other than the polymers described, demulsifiers, dehazers, antifoams, combustion improvers, antioxidants or stabilizers, antistats, metallocenes, metal deactivators, dyes and/or solvents.

Accordingly, the invention further provides for the use of polymers having a statistical average of
at least 4 acid groups per polymer chain,
a ratio of carbon atoms per acid group of 7 to 35 and
an acid number of 80 to 320 mg KOH/g, determined by potentiographic titration with 0.5 molar aqueous hydrochloric acid after heating in 0.5 molar ethanolic potassium hydroxide solution for three hours,
in additive packages comprising at least one additive selected from the group consisting of lubricity improvers (friction modifiers), corrosion inhibitors other than the polymers described, demulsifiers, dehazers, antifoams, combustion improvers, antioxidants, stabilizers, antistats, metallocenes, metal deactivators, dyes and solvents, for reducing corrosion in gasoline fuels having a content of alkali metals and/or alkaline earth metals and/or zinc of at least 0.1 ppm.

Typical examples of suitable coadditives are listed in the following section:

B1) Detergent Additives

The customary detergent additives are preferably amphiphilic substances which possess at least one hydrophobic hydrocarbon radical with a number-average molecular weight ($M_n$) of 85 to 20 000 and at least one polar moiety selected from:

(Da) mono- or polyamino groups having up to 6 nitrogen atoms, at least one nitrogen atom having basic properties;

(Db) nitro groups, optionally in combination with hydroxyl groups;

(Dc) hydroxyl groups in combination with mono- or polyamino groups, at least one nitrogen atom having basic properties;

(Dd) carboxyl groups or the alkali metal or alkaline earth metal salts thereof;

(De) sulfonic acid groups or the alkali metal or alkaline earth metal salts thereof;

(Df) polyoxy-$C_2$- to $C_4$-alkylene moieties terminated by hydroxyl groups, mono- or polyamino groups, at least one nitrogen atom having basic properties, or by carbamate groups;

(Dg) carboxylic ester groups;

(Dh) moieties derived from succinic anhydride and having hydroxyl and/or amino and/or amido and/or imido groups; and/or (Di) moieties obtained by Mannich reaction of substituted phenols with aldehydes and mono- or polyamines.

The hydrophobic hydrocarbon radical in the above detergent additives, which ensures the adequate solubility in the fuel, has a number-average molecular weight ($M_n$) of 85 to 20 000, preferably of 113 to 10 000, more preferably of 300 to 5000, even more preferably of 300 to 3000, even more especially preferably of 500 to 2500 and especially of 700 to 2500, in particular of 800 to 1500. As typical hydrophobic hydrocarbon radicals, especially in conjunction with the polar, especially polypropenyl, polybutenyl and polyisobutenyl radicals with a number-average molecular weight $M_n$ of preferably in each case 300 to 5000, more preferably 300 to 3000, even more preferably 500 to 2500, even more especially preferably 700 to 2500 and especially 800 to 1500 into consideration.

Examples of the above groups of detergent additives include the following:

Additives comprising mono- or polyamino groups (Da) are preferably polyalkenemono- or polyalkenepolyamines based on polypropene or on high-reactivity (i.e. having predominantly terminal double bonds) or conventional (i.e. having predominantly internal double bonds) polybutene or polyisobutene with $M_n$=300 to 5000, more preferably 500 to 2500 and especially 700 to 2500. Such additives based on high-reactivity polyisobutene, which can be prepared from the polyisobutene which may comprise up to 20% by weight of n-butene units by hydroformylation and reductive amination with ammonia, monoamines or polyamines such as dimethylaminopropylamine, ethylenediamine, diethylenetriamine, triethylenetetramine or tetraethylenepentamine, are known especially from EP-A 244 616. When polybutene or polyisobutene having predominantly internal double bonds (usually in the β and γ positions) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or the abovementioned polyamines. Corresponding additives based on polypropene are described more particularly in WO-A 94/24231.

Further particular additives comprising monoamino groups (Da) are the hydrogenation products of the reaction products of polyisobutenes having an average degree of polymerization P=5 to 100 with nitrogen oxides or mixtures of nitrogen oxides and oxygen, as described more particularly in WO-A 97/03946.

Further particular additives comprising monoamino groups (Da) are the compounds obtainable from polyisobutene epoxides by reaction with amines and subsequent dehydration and reduction of the amino alcohols, as described more particularly in DE-A 196 20 262.

Additives comprising nitro groups (Db), optionally in combination with hydroxyl groups, are preferably reaction products of polyisobutenes having an average degree of polymerization P=5 to 100 or 10 to 100 with nitrogen oxides or mixtures of nitrogen oxides and oxygen, as described more particularly in WO-A 96/03367 and in WO-A 96/03479. These reaction products are generally mixtures of pure nitropolyisobutenes (e.g. α,β-dinitropolyisobutene) and mixed hydroxynitropolyisobutenes (e.g. α-nitro-β-hydroxypolyisobutene).

Additives comprising hydroxyl groups in combination with mono- or polyamino groups (Dc) are especially reaction products of polyisobutene epoxides obtainable from polyisobutene having preferably predominantly terminal double bonds and $M_n=300$ to 5000, with ammonia or mono- or polyamines, as described more particularly in EP-A 476 485.

Additives comprising carboxyl groups or their alkali metal or alkaline earth metal salts (Dd) are preferably copolymers of $C_2$- to $C_{40}$-olefins with maleic anhydride which have a total molar mass of 500 to 20 000 and wherein some or all of the carboxyl groups have been converted to the alkali metal or alkaline earth metal salts and any remainder of the carboxyl groups has been reacted with alcohols or amines. Such additives are disclosed more particularly by EP-A 307 815. Such additives serve mainly to prevent valve seat wear and can, as described in WO-A 87/01126, advantageously be used in combination with customary fuel detergents such as poly(iso)buteneamines or polyetheramines.

Additives comprising sulfonic acid groups or their alkali metal or alkaline earth metal salts (De) are preferably alkali metal or alkaline earth metal salts of an alkyl sulfosuccinate, as described more particularly in EP-A 639 632. Such additives serve mainly to prevent valve seat wear and can be used advantageously in combination with customary fuel detergents such as poly(iso)buteneamines or polyetheramines.

Additives comprising polyoxy-$C_2$-$C_4$-alkylene moieties (Df) are preferably polyethers or polyetheramines which are obtainable by reaction of $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. In the case of polyethers, such products also have carrier oil properties. Typical examples thereof are tridecanol butoxylates or isotridecanol butoxylates, isononylphenol butoxylates and also polyisobutenol butoxylates and propoxylates, and also the corresponding reaction products with ammonia.

Additives comprising carboxylic ester groups (Dg) are preferably esters of mono-, di- or tricarboxylic acids with long-chain alkanols or polyols, especially those having a minimum viscosity of 2 mm$^2$/s at 100° C., as described more particularly in DE-A 38 38 918. The mono-, di- or tricarboxylic acids used may be aliphatic or aromatic acids, and particularly suitable ester alcohols or ester polyols are long-chain representatives having, for example, 6 to 24 carbon atoms. Typical representatives of the esters are adipates, phthalates, isophthalates, terephthalates and trimellitates of isooctanol, of isononanol, of isodecanol and of isotridecanol. Such products also satisfy carrier oil properties.

Additives comprising moieties derived from succinic anhydride and having hydroxyl and/or amino and/or amido and/or especially imido groups (Dh) are preferably corresponding derivatives of alkyl- or alkenyl-substituted succinic anhydride and especially the corresponding derivatives of polyisobutenylsuccinic anhydride which are obtainable by reacting conventional or high-reactivity polyisobutene having $M_n$=preferably 300 to 5000, more preferably 300 to 3000, even more preferably 500 to 2500, even more especially preferably 700 to 2500 and especially 800 to 1500, with maleic anhydride by a thermal route in an ene reaction or via the chlorinated polyisobutene. The moieties having hydroxyl and/or amino and/or amido and/or imido groups are, for example, carboxylic acid groups, acid amides of monoamines, acid amides of di- or polyamines which, in addition to the amide function, also have free amine groups, succinic acid derivatives having an acid and an amide function, carboximides with monoamines, carboximides with di- or polyamines which, in addition to the imide function, also have free amine groups, or diimides which are formed by the reaction of di- or polyamines with two succinic acid derivatives. Such fuel additives are common knowledge and are described, for example, in documents (1) and (2). They are preferably the reaction products of alkyl- or alkenyl-substituted succinic acids or derivatives thereof with amines and more preferably the reaction products of polyisobutenyl-substituted succinic acids or derivatives thereof with amines. Of particular interest in this context are reaction products with aliphatic polyamines (polyalkyleneimines) such as, more particularly, ethylenediamine, diethylenetriamine, triethylenetetramine, tetraethylenepentamine, pentaethylenehexamine and hexaethyleneheptamine, which have an imide structure.

Additives comprising moieties (Di) obtained by Mannich reaction of substituted phenols with aldehydes and mono- or polyamines are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may originate from conventional or high-reactivity polyisobutene having $M_n$=300 to 5000. Such "polyisobutene Mannich bases" are described more particularly in EP-A 831 141.

One or more of the detergent additives mentioned can be added to the fuel in such an amount that the dosage of these detergent additives is preferably 25 to 2500 ppm by weight, especially 75 to 1500 ppm by weight, in particular 150 to 1000 ppm by weight.

B2) Carrier Oils

Carrier oils additionally used may be of mineral or synthetic nature. Suitable mineral carrier oils are fractions obtained in crude oil processing, such as brightstock or base oils having viscosities, for example, from the SN 500-2000 class; but also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range of from about 360 to 500° C., obtainable from natural mineral oil which has been catalytically hydrogenated under high pressure and isomerized and also deparaffinized). Likewise suitable are mixtures of the abovementioned mineral carrier oils.

Examples of suitable synthetic carrier oils are polyolefins (polyalphaolefins or polyinternalolefins), (poly)esters, (poly)alkoxylates, polyethers, aliphatic polyether-amines, alkylphenol-started polyethers, alkylphenol-started polyetheramines and carboxylic esters of long-chain alkanols.

Examples of suitable polyolefins are olefin polymers having $M_n$=400 to 1800, in particular based on polybutene or polyisobutene (hydrogenated or unhydrogenated).

Examples of suitable polyethers or polyetheramines are preferably compounds comprising polyoxy-$C_2$- to $C_4$-alkylene moieties obtainable by reacting $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group, and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. For example, the polyetheramines used may be poly-$C_2$- to $C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are more particularly esters of mono-, di- or tricarboxylic acids with long-chain alkanols or polyols, as described more particularly in DE-A 38 38 918. The mono-, di- or tricarboxylic acids used may be aliphatic or aromatic acids; particularly suitable ester alcohols or ester polyols are long-chain representatives having, for example, 6 to 24 carbon atoms. Typical representatives of the esters are adipates, phthalates, isophthalates, terephthalates and trimellitates of isooctanol, isononanol, isodecanol and isotridecanol, for example di(n- or isotridecyl) phthalate.

Further suitable carrier oil systems are described, for example, in DE-A 38 26 608, DE-A 41 42 241, DE-A 43 09 074, EP-A 452 328 and EP-A 548 617.

Examples of particularly suitable synthetic carrier oils are alcohol-started polyethers having about 5 to 35, preferably about 5 to 30, more preferably 10 to 30 and especially 15 to 30 $C_3$- to $C_6$-alkylene oxide units, for example propylene oxide, n-butylene oxide and isobutylene oxide units, or mixtures thereof, per alcohol molecule. Nonlimiting examples of suitable starter alcohols are long-chain alkanols or phenols substituted by long-chain alkyl in which the long-chain alkyl radical is especially a straight-chain or branched $C_6$- to $C_{18}$-alkyl radical. Particular examples include tridecanol and nonylphenol. Particularly preferred alcohol-started polyethers are the reaction products (polyetherification products) of monohydric aliphatic $C_6$- to $C_{18}$-alcohols with $C_3$- to $C_6$-alkylene oxides. Examples of monohydric aliphatic $C_6$-$C_{18}$-alcohols are hexanol, heptanol, octanol, 2-ethylhexanol, nonyl alcohol, decanol, 3-propylheptanol, undecanol, dodecanol, tridecanol, tetradecanol, pentadecanol, hexadecanol, octadecanol and the constitutional and positional isomers thereof. The alcohols can be used either in the form of the pure isomers or in the form of technical grade mixtures. A particularly preferred alcohol is tridecanol. Examples of $C_3$- to $C_6$-alkylene oxides are propylene oxide, such as 1,2-propylene oxide, butylene oxide, such as 1,2-butylene oxide, 2,3-butylene oxide, isobutylene oxide or tetrahydrofuran, pentylene oxide and hexylene oxide. Particular preference among these is given to $C_3$- to $C_4$-alkylene oxides, i.e. propylene oxide such as 1,2-propylene oxide and butylene oxide such as 1,2-butylene oxide, 2,3-butylene oxide and isobutylene oxide. Especially butylene oxide is used.

Further suitable synthetic carrier oils are alkoxylated alkylphenols, as described in DE-A 10 102 913.

Particular carrier oils are synthetic carrier oils, particular preference being given to the above-described alcohol-started polyethers.

The carrier oil or the mixture of different carrier oils is added to the fuel in an amount of preferably 1 to 1000 ppm by weight, more preferably of 10 to 500 ppm by weight and especially of 20 to 100 ppm by weight.

B3) Cold Flow Improvers

Suitable cold flow improvers are in principle all organic compounds which are capable of improving the flow performance of middle distillate fuels or diesel fuels under cold conditions. For the intended purpose, they must have sufficient oil solubility. More particularly, useful cold flow improvers for this purpose are the cold flow improvers (middle distillate flow improvers, MDFIs) typically used in the case of middle distillates of fossil origin, i.e. in the case of customary mineral diesel fuels. However, it is also possible to use organic compounds which partly or predominantly have the properties of a wax antisettling additive (WASA) when used in customary diesel fuels. They can also act partly or predominantly as nucleators. It is also possible to use mixtures of organic compounds effective as MDFIs and/or effective as WASAs and/or effective as nucleators.

The cold flow improver is typically selected from:

(K1) copolymers of a $C_2$- to $C_{40}$-olefin with at least one further ethylenically unsaturated monomer;

(K2) comb polymers;

(K3) polyoxyalkylenes;

(K4) polar nitrogen compounds;

(K5) sulfocarboxylic acids or sulfonic acids or derivatives thereof; and (K6) poly(meth)acrylic esters.

It is possible to use either mixtures of different representatives from one of the particular classes (K1) to (K6) or mixtures of representatives from different classes (K1) to (K6).

Suitable $C_2$- to $C_{40}$-olefin monomers for the copolymers of class (K1) are, for example, those having 2 to 20 and especially 2 to 10 carbon atoms, and 1 to 3 and preferably 1 or 2 carbon-carbon double bonds, especially having one carbon-carbon double bond. In the latter case, the carbon-carbon double bond may be arranged either terminally (α-olefins) or internally. However, preference is given to α-olefins, particular preference to α-olefins having 2 to 6 carbon atoms, for example propene, 1-butene, 1-pentene, 1-hexene and in particular ethylene.

In the copolymers of class (K1), the at least one further ethylenically unsaturated monomer is preferably selected from alkenyl carboxylates, (meth)acrylic esters and further olefins.

When further olefins are also copolymerized, they are preferably higher in molecular weight than the abovementioned $C_2$- to $C_{40}$-olefin base monomers. When, for example, the olefin base monomer used is ethylene or propene, suitable further olefins are especially $C_{10}$- to $C_{40}$-α-olefins. Further olefins are in most cases only additionally copolymerized when monomers with carboxylic ester functions are also used.

Suitable (meth)acrylic esters are, for example, esters of (meth)acrylic acid with $C_1$- to $C_{20}$-alkanols, especially $C_1$- to $C_{10}$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol, and structural isomers thereof.

Suitable alkenyl carboxylates are, for example, $C_2$- to $C_{14}$-alkenyl esters, for example the vinyl and propenyl esters, of carboxylic acids having 2 to 21 carbon atoms, whose hydrocarbyl radical may be linear or branched. Among these, preference is given to the vinyl esters. Among the carboxylic acids with a branched hydrocarbyl radical, preference is given to those whose branch is in the α position to the carboxyl group, and the α-carbon atom is more preferably tertiary, i.e. the carboxylic acid is what is called a neocarboxylic acid. However, the hydrocarbyl radical of the carboxylic acid is preferably linear.

Examples of suitable alkenyl carboxylates are vinyl acetate, vinyl propionate, vinyl butyrate, vinyl 2-ethyl hexanoate, vinyl neopentanoate, vinyl hexanoate, vinyl neononanoate, vinyl neodecanoate and the corresponding propenyl esters, preference being given to the vinyl esters. A particularly preferred alkenyl carboxylate is vinyl acetate; typical copolymers of group (K1) resulting therefrom are ethylene-vinyl acetate copolymers ("EVAs"), which are some of the most frequently used.

Ethylene-vinyl acetate copolymers usable particularly advantageously and the preparation thereof are described in WO 99/29748.

Suitable copolymers of class (K1) are also those which comprise two or more different alkenyl carboxylates in copolymerized form, which differ in the alkenyl function and/or in the carboxylic acid group. Likewise suitable are copolymers which, as well as the alkenyl carboxylate(s), comprise at least one olefin and/or at least one (meth)acrylic ester in copolymerized form.

Terpolymers of a $C_2$- to $C_{40}$-α-olefin, a $C_1$- to $C_{20}$-alkyl ester of an ethylenically unsaturated monocarboxylic acid having 3 to 15 carbon atoms and a $C_2$- to $C_{14}$-alkenyl ester of a saturated monocarboxylic acid having 2 to 21 carbon atoms are also suitable as copolymers of class (K1). Terpolymers of this kind are described in WO 2005/054314. A typical terpolymer of this kind is formed from ethylene, 2-ethylhexyl acrylate and vinyl acetate.

The at least one or the further ethylenically unsaturated monomer(s) are copolymerized in the copolymers of class (K1) in an amount of preferably 1 to 50% by weight, especially 10 to 45% by weight and in particular 20 to 40% by weight, based on the overall copolymer. The main proportion in terms of weight of the monomer units in the copolymers of class (K1) therefore originates generally from the $C_2$- to $C_{40}$ base olefins.

The copolymers of class (K1) preferably have a number-average molecular weight $M_n$ of 1000 to 20 000, more preferably of 1000 to 10 000 and especially of 1000 to 8000.

Typical comb polymers of component (K2) are, for example, obtainable by the copolymerization of maleic anhydride or fumaric acid with another ethylenically unsaturated monomer, for example with an α-olefin or an unsaturated ester, such as vinyl acetate, and subsequent esterification of the anhydride or acid function with an alcohol having at least 10 carbon atoms. Further suitable comb polymers are copolymers of α-olefins and esterified comonomers, for example esterified copolymers of styrene and maleic anhydride or esterified copolymers of styrene and fumaric acid. Suitable comb polymers may also be polyfumarates or polymaleates. Homo- and copolymers of vinyl ethers are also suitable comb polymers. Comb polymers suitable as components of class (K2) are, for example, also those described in WO 2004/035715 and in "Comb-Like Polymers, Structure and Properties", N. A. Platé and V. P. Shibaev, J. Poly. Sci. Macromolecular Revs. 8, pages 117 to 253 (1974). Mixtures of comb polymers are also suitable.

Polyoxyalkylenes suitable as components of class (K3) are, for example, polyoxyalkylene esters, polyoxyalkylene ethers, mixed polyoxyalkylene ester/ethers and mixtures thereof. These polyoxyalkylene compounds preferably comprise at least one linear alkyl group, preferably at least two linear alkyl groups, each having 10 to 30 carbon atoms and a polyoxyalkylene group having a number-average molecular weight of up to 5000. Such polyoxyalkylene compounds are described, for example, in EP-A 061 895 and also in U.S. Pat. No. 4,491,455. Particular polyoxyalkylene compounds are based on polyethylene glycols and polypropylene glycols having a number-average molecular weight of 100 to 5000. Additionally suitable are polyoxyalkylene mono- and diesters of fatty acids having 10 to 30 carbon atoms, such as stearic acid or behenic acid.

Polar nitrogen compounds suitable as components of class (K4) may be either ionic or nonionic and preferably have at least one substituent, especially at least two substituents, in the form of a tertiary nitrogen atom of the general formula >$NR^7$ in which $R^7$ is a $C_8$- to $C_{40}$-hydrocarbyl radical. The nitrogen substituents may also be quaternized, i.e. be in cationic form. Examples of such nitrogen compounds are ammonium salts and/or amides which are obtainable by the reaction of at least one amine substituted by at least one hydrocarbyl radical with a carboxylic acid having 1 to 4 carboxyl groups or with a suitable derivative thereof. The amines preferably comprise at least one linear $C_8$- to $C_{40}$-alkyl radical. Primary amines suitable for preparing the polar nitrogen compounds mentioned are, for example, octylamine, nonylamine, decylamine, undecylamine, dodecylamine, tetradecylamine and the higher linear homologs; secondary amines suitable for this purpose are, for example, dioctadecylamine and methylbehenylamine. Also suitable for this purpose are amine mixtures, especially amine mixtures obtainable on the industrial scale, such as fatty amines or hydrogenated tallamines, as described, for example, in Ullmann's Encyclopedia of Industrial Chemistry, 6th Edition, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalenedicarboxylic acid, phthalic acid, isophthalic acid, terephthalic acid, and succinic acids substituted by long-chain hydrocarbyl radicals.

More particularly, the component of class (K4) is an oil-soluble reaction product of poly($C_2$- to $C_{20}$-carboxylic acids) having at least one tertiary amino group with primary or secondary amines. The poly($C_2$-to-$C_{20}$-carboxylic acids) which have at least one tertiary amino group and form the basis of this reaction product comprise preferably at least 3 carboxyl groups, especially 3 to 12 and in particular 3 to 5 carboxyl groups. The carboxylic acid units in the polycarboxylic acids have preferably 2 to 10 carbon atoms, and are especially acetic acid units. The carboxylic acid units are suitably bonded to the polycarboxylic acids, usually via one or more carbon and/or nitrogen atoms. They are preferably attached to tertiary nitrogen atoms which, in the case of a plurality of nitrogen atoms, are bonded via hydrocarbon chains.

The component of class (K4) is preferably an oil-soluble reaction product based on poly($C_2$- to $C_{20}$-carboxylic acids) which have at least one tertiary amino group and are of the general formula IIa or IIb

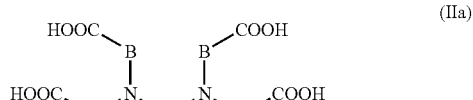

(IIa)

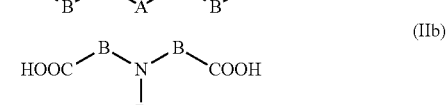

(IIb)

in which the variable A is a straight-chain or branched $C_2$- to $C_6$-alkylene group or the moiety of the formula III

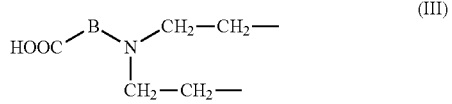

and the variable B is a $C_1$- to $C_{19}$-alkylene group. The compounds of the general formulae IIa and IIb especially have the properties of a WASA.

Moreover, the preferred oil-soluble reaction product of component (K4), especially that of the general formula IIa or IIb, is an amide, an amide-ammonium salt or an ammonium salt in which no, one or more carboxylic acid groups have been converted to amide groups.

Straight-chain or branched $C_2$- to $C_6$-alkylene groups of the variable A are, for example, 1,1-ethylene, 1,2-propylene, 1,3-propylene, 1,2-butylene, 1,3-butylene, 1,4-butylene, 2-methyl-1,3-propylene, 1,5-pentylene, 2-methyl-1,4-butylene, 2,2-dimethyl-1,3-propylene, 1,6-hexylene (hexamethylene) and especially 1,2-ethylene. The variable A comprises preferably 2 to 4 and especially 2 or 3 carbon atoms.

$C_1$- to $C_{19}$-alkylene groups of the variable B are, for example, 1,2-ethylene, 1,3-propylene, 1,4-butylene, hexamethylene, octamethylene, decamethylene, dodecamethylene, tetradecamethylene, hexadecamethylene, octadecamethylene, nonadecamethylene and especially methylene. The variable B comprises preferably 1 to 10 and especially 1 to 4 carbon atoms.

The primary and secondary amines as a reaction partner for the polycarboxylic acids to form component (K4) are typically monoamines, especially aliphatic monoamines. These primary and secondary amines may be selected from a multitude of amines which bear hydrocarbyl radicals which may optionally be bonded to one another.

These parent amines of the oil-soluble reaction products of component (K4) are usually secondary amines and have the general formula $HN(R^8)_2$ in which the two variables $R^8$ are each independently straight-chain or branched $C_{10}$- to $C_{30}$-alkyl radicals, especially $C_{14}$- to $C_{24}$-alkyl radicals. These relatively long-chain alkyl radicals are preferably straight-chain or only slightly branched. In general, the secondary amines mentioned, with regard to their relatively long-chain alkyl radicals, derive from naturally occurring fatty acids and from derivatives thereof. The two $R^8$ radicals are preferably identical.

The secondary amines mentioned may be bonded to the polycarboxylic acids by means of amide structures or in the form of the ammonium salts; it is also possible for only a portion to be present as amide structures and another portion as ammonium salts. Preferably only few, if any, free acid groups are present. The oil-soluble reaction products of component (K4) are preferably present completely in the form of the amide structures.

Typical examples of such components (K4) are reaction products of nitrilotriacetic acid, of ethylenediaminetetraacetic acid or of propylene-1,2-diaminetetraacetic acid with in each case 0.5 to 1.5 mol per carboxyl group, especially 0.8 to 1.2 mol per carboxyl group, of dioleylamine, dipalmitamine, dicocoamine, distearylamine, dibehenylamine or especially ditallamine. A particularly preferred component (K4) is the reaction product of 1 mol of ethylenediaminetetraacetic acid and 4 mol of hydrogenated ditallamine.

Further typical examples of component (K4) include the N,N-dialkylammonium salts of 2-N',N'-dialkylamidobenzoates, for example the reaction product of 1 mol of phthalic anhydride and 2 mol of ditallamine, the latter being hydrogenated or unhydrogenated, and the reaction product of 1 mol of an alkenylspirobislactone with 2 mol of a dialkylamine, for example ditallamine and/or tallamine, the latter two being hydrogenated or unhydrogenated.

Further typical structure types for the component of class (K4) are cyclic compounds with tertiary amino groups or condensates of long-chain primary or secondary amines with carboxylic acid-containing polymers, as described in WO 93/18115.

Sulfocarboxylic acids, sulfonic acids or derivatives thereof which are suitable as cold flow improvers of the component of class (K5) are, for example, the oil-soluble carboxamides and carboxylic esters of ortho-sulfobenzoic acid, in which the sulfonic acid function is present as a sulfonate with alkyl-substituted ammonium cations, as described in EP-A 261 957.

Poly(meth)acrylic esters suitable as cold flow improvers of the component of class (K6) are either homo- or copolymers of acrylic and methacrylic esters. Preference is given to copolymers of at least two different (meth)acrylic esters which differ with regard to the esterified alcohol. The copolymer optionally comprises another different olefinically unsaturated monomer in copolymerized form. The weight-average molecular weight of the polymer is preferably 50 000 to 500 000. A particularly preferred polymer is a copolymer of methacrylic acid and methacrylic esters of saturated $C_{14}$- and $C_{15}$-alcohols, the acid groups having been neutralized with hydrogenated tallamine. Suitable poly(meth)acrylic esters are described, for example, in WO 00/44857.

The cold flow improver or the mixture of different cold flow improvers is added to the middle distillate fuel or diesel fuel in a total amount of preferably 10 to 5000 ppm by weight, more preferably of 20 to 2000 ppm by weight, even more preferably of 50 to 1000 ppm by weight and especially of 100 to 700 ppm by weight, for example of 200 to 500 ppm by weight.

B4) Lubricity Improvers

Suitable lubricity improvers or friction modifiers are based typically on fatty acids or fatty acid esters. Typical examples are tall oil fatty acid, as described, for example, in WO 98/004656, and glyceryl monooleate. The reaction products, described in U.S. Pat. No. 6,743,266 B2, of natural or synthetic oils, for example triglycerides, and alkanolamines are also suitable as such lubricity improvers.

B5) Corrosion Inhibitors Other than the Copolymer Described

Suitable corrosion inhibitors are, for example, succinic esters, in particular with polyols, fatty acid derivatives, for example oleic esters, oligomerized fatty acids, substituted ethanolamines, and products sold under the trade name RC 4801 (Rhein Chemie Mannheim, Germany), Irgacor® L12 (BASF SE) or HiTEC 536 (Ethyl Corporation).

B6) Demulsifiers

Suitable demulsifiers are, for example, the alkali metal or alkaline earth metal salts of alkyl-substituted phenol- and naphthalenesulfonates and the alkali metal or alkaline earth metal salts of fatty acids, and also neutral compounds such as alcohol alkoxylates, e.g. alcohol ethoxylates, phenol alkoxylates, e.g. tert-butylphenol ethoxylate or tert-pentylphenol ethoxylate, fatty acids, alkylphenols, condensation products of ethylene oxide (EO) and propylene oxide (PO), for example including in the form of EO/PO block copolymers, polyethyleneimines or else polysiloxanes.

B7) Dehazers

Suitable dehazers are, for example, alkoxylated phenol-formaldehyde condensates, for example the products available under the trade names NALCO 7D07 (Nalco) and TOLAD 2683 (Petrolite).

B8) Antifoams

Suitable antifoams are, for example, polyether-modified polysiloxanes, for example the products available under the trade names TEGOPREN 5851 (Goldschmidt), Q 25907 (Dow Corning) and RHODOSIL (Rhone Poulenc).

B9) Cetane Number Improvers

Suitable cetane number improvers are, for example, aliphatic nitrates such as 2-ethylhexyl nitrate and cyclohexyl nitrate and peroxides such as di-tert-butyl peroxide.

B10) Antioxidants

Suitable antioxidants are, for example, substituted phenols, such as 2,6-di-tert-butylphenol and 6-di-tert-butyl-3-methylphenol, and also phenylenediamines such as N,N'-di-sec-butyl-p-phenylenediamine.

B11) Metal Deactivators

Suitable metal deactivators are, for example, salicylic acid derivatives such as N,N'-disalicylidene-1,2-propanediamine.

B12) Solvents

Suitable solvents are, for example, nonpolar organic solvents such as aromatic and aliphatic hydrocarbons, for example toluene, xylenes, white spirit and products sold under the trade names SHELLSOL (Royal Dutch/Shell Group) and EXXSOL (ExxonMobil), and also polar organic solvents, for example, alcohols such as 2-ethylhexanol, decanol and isotridecanol. Such solvents are usually added to the diesel fuel together with the aforementioned additives and coadditives, which they are intended to dissolve or dilute for better handling.

C) Fuels

The inventive use relates in principle to any fuels, preferably diesel fuels and gasoline fuels. Middle distillate fuels such as diesel fuels or heating oils are preferably mineral oil raffinates which typically have a boiling range from 100 to 400° C. These are usually distillates having a 95% point up to 360° C. or even higher. These may also be what is called "ultra low sulfur diesel" or "city diesel", characterized by a 95% point of, for example, not more than 345° C. and a sulfur content of not more than 0.005% by weight or by a 95% point of, for example, 285° C. and a sulfur content of not more than 0.001% by weight. In addition to the mineral middle distillate fuels or diesel fuels obtainable by refining, those obtainable by coal gasification or gas liquefaction ["gas to liquid" (GTL) fuels] or by biomass liquefaction ["biomass to liquid" (BTL) fuels] are also suitable. Also suitable are mixtures of the aforementioned middle distillate fuels or diesel fuels with renewable fuels, such as biodiesel or bioethanol.

The qualities of the heating oils and diesel fuels are laid down in detail, for example, in DIN 51603 and EN 590 (cf. also Ullmann's Encyclopedia of Industrial Chemistry, 5th edition, Volume A12, p. 617 ff.).

The inventive use in middle distillate fuels of fossil, vegetable or animal origin, which are essentially hydrocarbon mixtures, also relates to mixtures of such middle distillates with biofuel oils (biodiesel). Mixtures of this kind are encompassed by the term "middle distillate fuel". They are commercially available and usually comprise the biofuel oils in minor amounts, typically in amounts of 1 to 30% by weight, especially of 3 to 10% by weight, based on the total amount of middle distillate of fossil, vegetable or animal origin and biofuel oil.

Biofuel oils are generally based on fatty acid esters, preferably essentially on alkyl esters of fatty acids which derive from vegetable and/or animal oils and/or fats. Alkyl esters are typically understood to mean lower alkyl esters, especially $C_1$- to $C_4$-alkyl esters, which are obtainable by transesterifying the glycerides which occur in vegetable and/or animal oils and/or fats, especially triglycerides, by means of lower alcohols, for example ethanol or in particular methanol ("FAME"). Typical lower alkyl esters based on vegetable and/or animal oils and/or fats, which find use as a biofuel oil or components thereof, are, for example, sunflower methyl ester, palm oil methyl ester ("PME"), soya oil methyl ester ("SME") and especially rapeseed oil methyl ester ("RME").

The middle distillate fuels or diesel fuels are more preferably those having a low sulfur content, i.e. having a sulfur content of less than 0.05% by weight, preferably of less than 0.02% by weight, more particularly of less than 0.005% by weight and especially of less than 0.001% by weight of sulfur.

Useful gasoline fuels include all commercial gasoline fuel compositions. One typical representative which shall be mentioned here is the Eurosuper base fuel to EN 228, which is customary on the market. In addition, gasoline fuel compositions of the specification according to WO 00/47698 are also possible fields of use for the present invention.

The examples which follow are intended to illustrate the present invention without restricting it.

EXAMPLES

GPC Analysis

Unless stated otherwise, the mass-average molecular weight Mw and number-average molecular weight Mn of the polymers was measured by means of gel permeation chromatography (GPC). GPC separation was effected by means of two PLge Mixed B columns (Agilent) in tetrahydrofuran at 35° C. Calibration was effected by means of a narrow-distribution polystyrene standard (from PSS, Germany) having a molecular weight of 162-50 400 Da. Hexylbenzene was used as a marker for low molecular weight.

Determination of Acid Number

Determination of Efficacy Value 50 mL of 0.5 molar ethanolic KOH are heated in a 150 mL COD tube provided with an air cooler to 95° C. for three (3) hours. The air cooler is purged with 30 mL of ethanol and then the solution is potentiographically titrated with 0.5 molar aqueous hydrochloric acid (HCl).

Determination of the Sample

About 1 g of sample is weighed into a 150 mL COD tube and dissolved in 50 mL of 0.5 molar ethanolic KOH. The COD tube is provided with an air cooler and placed into a stirred block thermostat preheated to 95° C. After three (3) hours, the COD tube is removed from the heating block and rinsed with 30 mL of ethanol, and the solution is potentiographically titrated with 0.5 molar aqueous hydrochloric acid (HCl).

Preparation Examples

General Procedure

A reactor having an anchor stirrer was initially charged with the olefin or the mixture of olefins with or without solvent (as a bulk polymerization). The mixture was heated to the temperature specified under a nitrogen stream and while stirring. To this were added the free-radical initiator specified (optionally diluted in the same solvent) and molten maleic anhydride (1 equivalent based on olefin monomer). The reaction mixture was stirred at the same temperature for the reaction time specified and then cooled down. Subsequently, water was added (unless stated otherwise, 0.9 equivalent based on maleic anhydride) and the mixture was stirred either at 95° C. for 10-14 h or under pressure at 110° C. for 3 h.

Synthesis Example 1

A 2 L glass reactor having an anchor stirrer was initially charged with a mixture of $C_{20}$-$C_{24}$ olefins (363.2 g, average molar mass 296 g/mol) and Solvesso 150 (231.5 g, DHC Solvent Chemie GmbH, Speldorf). The mixture was heated to 160° C. in a nitrogen stream and while stirring. To this were added, within 5 h, a solution of di-tert-butyl peroxide (29.6 g, from Akzo Nobel) in Solvesso 150 (260.5 g) and molten maleic anhydride (120.3 g). The reaction mixture was stirred at 160° C. for 1 h and then cooled to 95° C. At this temperature, water (19.9 g) was added within 3 h and then stirring was continued for 11 h.

GPC (in THF) gave an Mn=1210 g/mol, Mw=2330 g/mol for the copolymer, which corresponds to a polydispersity of 1.9.

The copolymer had a ratio of carbon atoms per acid group of 13; the acid number determined by the above method was 210.8 mg KOH/g.

Synthesis Example 2

A 6 L metal reactor having an anchor stirrer was initially charged with a mixture of $C_{20}$-$C_{24}$ olefins (1743 g, average molar mass 296 g/mol) and Solvesso 150 (1297 g, DHC Solvent Chemie GmbH, Speldorf). The mixture was heated to 150° C. in a nitrogen stream and while stirring. To this were added, within 5 h, a solution of di-tert-butyl peroxide (118.4 g, from Akzo Nobel) in Solvesso 150 (1041 g) and molten maleic anhydride (577 g). The reaction mixture was stirred at 150° C. for 1 h and then cooled to 110° C. At this temperature, with an increase in pressure, water (95 g) was added and then stirring was continued for 3 h.

GPC (in THF) gave an Mn=1420 g/mol, Mw=2500 g/mol for the copolymer, which corresponds to a polydispersity of 1.8.

The copolymer had a ratio of carbon atoms per acid group of 13; the acid number determined by the above method was 210.8 mg KOH/g.

Synthesis Example 3

A 6 L metal reactor having an anchor stirrer was initially charged with a mixture of $C_{20}$-$C_{24}$ olefins (1743 g, average molar mass 296 g/mol) and Solvesso 150 (1297 g, DHC Solvent Chemie GmbH, Speldorf). The mixture was heated to 150° C. in a nitrogen stream and while stirring. To this were added, within 5 h, a solution of di-tert-butyl peroxide (23.7 g, from Akzo Nobel) in Solvesso 150 (912 g) and molten maleic anhydride (577 g). The reaction mixture was stirred at 150° C. for 1 h and then cooled to 110° C. At this temperature, with an increase in pressure, water (95 g) was added and then stirring was continued for 3 h.

GPC (in THF) gave an Mn=1500 g/mol, Mw=3200 g/mol for the copolymer, which corresponds to a polydispersity of 2.1.

The copolymer had a ratio of carbon atoms per acid group of 13; the acid number determined by the above method was 210.8 mg KOH/g.

Use Examples

The additive formulations specified in Table 2 were produced from the above synthesis examples by mixing with polyisobuteneamine (molar mass 1000), polypropylene glycol as carrier oil and solvent and dehazer, and used in the use examples (compositions in parts by weight).

1) Calcium Compatibility Test:

100 mL of motor oil (Shell Helix®, FIG. 1, far left beaker, with a Ca content of 1500 ppm, Mg content of 1100 ppm and Zn content of 1300 ppm) were heated to 70° C. in the beaker and then 1 mL of corrosion inhibitor was added. Should the solution still be clear, a further 1 mL of inhibitor is added. If the solution turns cloudy, the test is considered to have been failed (e.g. FIG. 1, right-hand beaker). FIG. 1 shows the oil to which copolymer according to synthesis example 1 (50% in Solvent Naphtha) has been added, which remains clear, in the middle. In the right-hand beaker, dimer fatty acid (dimeric oleic acid; CAS: 61788-89-4, 20% in Solvent Naphtha) was used. Distinctly visible turbidity is apparent.

2) Steel Corrosion Test to ASTM D 665 B a) The fuel used was conventional 95 octane EO gasoline fuel from Haltermann, which was additized with an additive package composed of polyisobuteneamine and carrier oil. The corrosion inhibitors specified in the table which follows were added to the formulation, which was subjected to a corrosion test to ASTM D 665 B.

Dimer fatty acid (dimeric oleic acid; CAS: 61788-89-4, as corrosion inhibitor, 20% in Solvent Naphtha) was used as a comparison.

| Corrosion inhibitor | | Active corrosion inhibitor content [ppm] | Assessment according to NACE |
|---|---|---|---|
| Blank value - Haltermann E0 (no additization) | — | — | D |
| Blank value - Haltermann E0 (with additization) | — | — | E |
| Formulation 1 | Dimer fatty acid | 2 | A |
| Formulation 2 | Synthesis example 1 | 2.5 | A |
| Formulation 3 | Synthesis example 1 | 5 | A |

The assessment was made as follows:
A 100% rust-free
B++ 0.1% or less of the total surface area rusted
B+ 0.1% to 5% of the total surface area rusted
B 5% to 25% of the total surface area rusted
C 25% to 50% of the total surface area rusted
D 50% to 75% of the total surface area rusted
E 75% to 100% of the total surface area rusted b) A further experiment was conducted analogously to a) but with an EO gasoline fuel KS-0001829 CEC DF-12-09.

The results are as follows:

| | Corrosion inhibitor | Active corrosion inhibitor content [ppm] | Assessment according to NACE |
|---|---|---|---|
| Base value KS-0001829 (without additization) | — | — | E |
| Formulation 13 | Dimer fatty acid | 2 | A |

-continued

| | Corrosion inhibitor | Active corrosion inhibitor content [ppm] | Assessment according to NACE |
|---|---|---|---|
| Formulation 14 | Synthesis example 2 | 2 | A |
| Formulation 1 | Dimer fatty acid | 2 | A |
| Formulation 7 | Synthesis example 3 | 2 | B+ |
| Formulation 11 | Dimer fatty acid | 2 | C | c) A further experiment was conducted analogously to a) but with a gasoline fuel KS-0001858 MIRO 95 OCTANE E10.

The results are as follows:

| | Corrosion inhibitor | Active corrosion inhibitor content [ppm] | Assessment according to NACE |
|---|---|---|---|
| Base value KS-0001858 (without additization) | — | — | E |
| Formulation 13 | Dimer fatty acid | 2 | B++ |
| Formulation 14 | Synthesis example 2 | 2 | B+ |
| Formulation 1 | Dimer fatty acid | 2 | A |
| Formulation 7 | Synthesis example 3 | 2 | A |
| Formulation 11 | Dimer fatty acid | 2 | B+ | d) The test was conducted in accordance with standard ASTM D665 A (modified) with distilled water and ASTM D665 B (modified) with synthetic seawater in a mixture with diesel base fuel in accordance with EN590 B7, without performance additives. The modifications were that the temperature was 60° C. and the duration of the test was 4 hours.

| Additive | Assessment in the ASTM D665A test (with distilled water) | Assessment in the ASTM D665B test (with synthetic seawater) |
|---|---|---|
| No additions | B | E |
| 140 mg/kg of sample according to preparation example 1 | A | B | e) A further experiment was conducted according to ASTM D 665 B, in which a conventional 95 octane EO gasoline fuel was used and was additized with an additive package composed of polyisobuteneamine and carrier oil. Polyisobutenesuccinic acid (based on polyisobutene of molar mass 1000) and dimer fatty acid (dimeric oleic acid; CAS: 61788-89-4) were added to the formulation as a comparison and subjected to a corrosion test according to ASTM D 665 B.

| | Dosage [mg/kg] | NACE rating |
|---|---|---|
| Base value E0 RON 95 | | E |
| Dimer fatty acid | 2 | A/B* |
| Polyisobutenesuccinic acid | 2 | C |
| Polyisobutenesuccinic acid | 8 | B/C* |

*two tests f) A further experiment was conducted according to ASTM D 665 B, in which a conventional 95 octane EO gasoline fuel was used and was additized with an additive package composed of polyisobuteneamine (based on polyisobutene of molar mass 1000), dehazer and carrier oil. Dodecenylsuccinic acid (acid number 392 mg KOH/g) and dimer fatty acid (dimeric oleic acid; CAS: 61788-89-4) were added to the formulation as a comparison and subjected to a corrosion test according to ASTM D 665 B.

| | Dosage [mg/kg] | NACE rating* |
|---|---|---|
| Base value E0 RON 95 | | D |
| Dimer fatty acid | 2 | A/B+ |
| Dodecenylsuccinic acid | 3.2 | A/B++ |
| Dodecenylsuccinic acid | 2.75 | B++/B++ |

*two tests

The dodecenylsuccinic acid-containing additive package showed a separation into phases on storage at room temperature, which shows that dodecenylsuccinic acid does not have adequate solubility in the additive package.

3) Copper Corrosion a) In Gasoline

Copper coupons (dimensions 49×25×1.5 mm, punched in the middle) were carefully polished with a polishing machine having the appropriate polishing brush without firm pressure on both sides and on all edges. The polished coupons were rubbed well several times with xylene and acetone using a clean cloth, using rubber gloves. 200 mL of fuel were introduced into a 250 mL screw-top glass bottle. The coupon was secured with a thread and suspended in the fuel bottle. The thread was fixed by trapping it in the screw thread.

Storage took place at room temperature (23° C.). After the first storage period (7 days) had elapsed, a sample was taken (20-30 mL), the glass bottle was closed again and the metal content was determined by means of atomic absorption spectroscopy. The storage was continued. After repeated sampling and dropping of liquid level, it was ensured that the copper coupon was fully covered by fuel.

The results are listed in table 1.

It is apparent from the results in table 1 that the compounds of the invention used, in the same dosage, have a lower tendency to leach copper out of wetted surfaces in fuels than the dimer fatty acid used as a comparison.

b) In Diesel Fuel

To study the corrosion characteristics of the sample from synthesis example 1 with respect to nonferrous metals, tests were conducted with zinc and copper wires.

80 mL of Aral B7 EN590 fuel were dispensed into each of four bottles, to two of which had been added 140 ppm of a sample from synthesis example 1. Degreased copper wire of length 20 cm and diameter 1 mm was positioned in one bottle with and one bottle without this sample. Analogously, degreased zinc wire of length 20 cm and diameter 1 mm was positioned in one bottle with and one bottle without this sample.

The copper or zinc content of the original fuel was determined after storage at 40° C. for 6 weeks by means of atomic emission spectroscopy (ICP/OES).

|  | Fuel (start) | Fuel (no addition, 6 weeks at 40° C.) | Fuel (140 ppm added, 6 weeks at 40° C.) |
|---|---|---|---|
| Zn content [mg/kg] | <1 | <1 | <1 |
| Cu content [mg/kg] | <1 | 4 | <1 |

It can be seen that the compounds of the invention have a corrosion-inhibiting effect on nonferrous metals, especially on copper.

4) PFI Engine Test DC M111E

An engine test was conducted over 60 hours according to CEC F-020-98 with MIRO 95 octane E10 fuel, and the internal valve deposits (IVD) and total chamber deposits (TCD values) were determined.

A TCD value of 4122 mg was found in keep-clean mode for the additized fuel without corrosion inhibitor, but a TCD value of 3940 mg for the additized fuel with corrosion inhibitor (formulation 10).

In addition, an IVD value of 116 mg/valve was found for the unadditized fuel and, in keep-clean mode, an IVD value of 2 mg/valve for the additized fuel without corrosion inhibitor, but an IVD value of 1 mg/valve for the additized fuel with corrosion inhibitor (formulation 10).

5) Keep-Clean Test in a Gasoline Direct Injection Engine (DISI)

A commercially available DISI (direct injection spark injection) engine (cylinder capacity 1.6 liters) was operated with an E10 gasoline fuel from MIRO (7% by volume of oxygen-containing components) at a speed of 4000 rpm for 50 hours.

In the first run, the fuel did not comprise any additives. The FR value fluctuated between 0 and -1.

In the second run, the fuel comprised 520 mg/kg of formulation 10. The FR value fluctuated between -2 and -3.

In both runs, the FR value was determined. FR is a parameter which is generated by the engine control system in accordance with the injection of fuel into the combustion chamber. The formation of deposits is manifested by a rising FR value during a run. The more it grows, the more deposits have formed. If the FR value remains constant or decreases, the injector nozzle also remains clean. In neither run does the FR value rise, which indicates that the copolymer claimed does not have any adverse effect on injector cleanliness.

TABLE 1

|  | Active component | Active component mg/kg | E0 fuel from 2)b) Duration [days] 7 Copper content mg/kg | E0 fuel from 2)b) Duration [days] 14 Copper content mg/kg | E0 fuel from 2)b) Duration [days] 28 Copper content mg/kg | E10 fuel from 2)c) Duration [days] 7 Copper content mg/kg | E10 fuel from 2)c) Duration [days] 14 Copper content mg/kg | E10 fuel from 2)c) Duration [days] 28 Copper content mg/kg |
|---|---|---|---|---|---|---|---|---|
| No additization | — | — | <0.1 | <0.1 | — | 0.4 | 0.7 | — |
| Formulation 12 | — | — | 0.1 | 0.2 | — | 0.5 | 0.8 | — |
| Formulation 1 | Dimer fatty acid | 2.0 | 0.2 | 0.4 | 0.8 | 0.9 | 1.7 | 3 |
| Formulation 4 | Synthesis example 2 | 2.0 | 0.1 | 0.2 | 0.4 | 0.8 | 1.4 | 2.5 |
| Formulation 5 | Synthesis example 2 | 4.0 | 0.2 | 0.3 | 0.6 | 1 | 1.7 | 3 |
| Formulation 6 | Synthesis example 2 | 8.0 | 0.3 | 0.5 | 0.7 | 1.2 | 1.8 | 3 |
| Formulation 7 | Synthesis example 3 | 2.0 | 0.1 | 0.3 | 0.5 | 0.9 | 1.4 | 2.7 |
| Formulation 8 | Synthesis example 3 | 4.0 | 0.2 | 0.4 | 0.6 | 1.1 | 1.7 | 3 |
| Formulation 9 | Synthesis example 3 | 8.0 | 0.3 | 0.5 | 0.8 | 1 | 1.8 | 2.8 |

TABLE 2

|  | Polyisobutene amine | Carrier oil | Dimer fatty acid | Synthesis example 1 (50% in Solvent Naphtha) | Synthesis example 2 (40% in Solvent Naphtha) | Synthesis example 3 (40% in Solvent Naphtha) | Solvent + dehazer | Sum total |
|---|---|---|---|---|---|---|---|---|
| Formulation 1 | 248 | 195 | 10 |  |  |  | 47 | 500 |
| Formulation 2 | 248 | 195 |  | 5 |  |  | 47 | 495 |
| Formulation 3 | 248 | 195 |  | 10 |  |  | 47 | 500 |
| Formulation 4 | 248 | 195 |  |  | 5 |  | 47 | 495 |
| Formulation 5 | 248 | 195 |  |  | 10 |  | 47 | 500 |
| Formulation 6 | 248 | 195 |  |  | 20 |  | 47 | 510 |
| Formulation 7 | 248 | 195 |  |  |  | 5 | 47 | 495 |
| Formulation 8 |  |  |  |  |  | 10 | 47 | 500 |
| Formulation 9 |  |  |  |  |  | 20 | 47 | 510 |
| Formulation 10 | 248 | 195 |  |  | 30 |  | 47 | 520 |
| Formulation 11 | 248 | 195 | 5 |  |  |  | 47 | 495 |

TABLE 2-continued

| | Polyisobutene amine | Carrier oil | Dimer fatty acid | Synthesis example 1 (50% in Solvent Naphtha) | Synthesis example 2 (40% in Solvent Naphtha) | Synthesis example 3 (40% in Solvent Naphtha) | Solvent + dehazer | Sum total |
|---|---|---|---|---|---|---|---|---|
| Formulation 12 | 248 | 195 | | | | | 47 | 490 |
| Formulation 13 | 259 | 156 | 10 | | | | 596 | 1021 |
| Formulation 14 | 259 | 156 | | | 5 | | 596 | 1016 |

The invention claimed is:

1. A method of inhibiting corrosion in a fuel system, the method comprising:
 passing a fuel through a fuel system, wherein the fuel comprises:
 at least one of an alkali metal, an alkaline earth metal, and zinc in an amount of at least 0.1 ppm by weight; and
 a polymer having a statistical average of
  at least 4 acid groups per polymer chain,
  a ratio of carbon atoms per acid group of 7 to 35, and
  an acid number of 80 to 320 mg KOH/g, determined by potentiographic titration with 0.5 molar aqueous hydrochloric acid after heating in 0.5 molar ethanolic potassium hydroxide solution for three hours.

2. The method according to claim 1, wherein the fuel comprises at least one of sodium, zinc, magnesium and calcium.

3. The method according to claim 1, wherein the acid groups are carboxyl groups.

4. The method according to claim 1, wherein the polymer comprises up to 50 acid groups per polymer chain.

5. The method according to claim 1, wherein the polymer comprises not more than 5 functional groups other than oxygen-containing functional groups and nitrogen-containing functional groups per polymer chain.

6. The method according to claim 1, wherein the polymer comprises not more than 3 oxygen-containing functional groups per polymer chain other than carbonate groups, ether groups or ester groups.

7. The method according to claim 1, wherein the polymer comprises not more than 20 ether groups per polymer chain.

8. The method according to claim 1, wherein the polymer comprises not more than 50 carbonate groups or ester groups per polymer chain.

9. The method according to claim 1, wherein the polymer has a weight-average molecular weight Mw of 0.5 to 20 kDa (determined by gel permeation chromatography with tetrahydrofuran and polystyrene as standard) and a polydispersity of 1 to 10.

10. The method according to claim 1, wherein the fuel system comprises an article that comprises at least one of iron, steel, and a nonferrous metal.

11. The method according to claim 1, wherein the fuel system comprises an article that comprises copper.

12. The method according to claim 1, wherein the fuel is a diesel fuel or gasoline fuel.

13. The method according to claim 1, wherein the polymer has a solubility in toluene at 20° C. of at least 0.5 g/100 mL.

14. A method of inhibiting corrosion in a diesel fuel system, the method comprising:
 passing a diesel fuel through a fuel system, wherein the diesel fuel comprises:
 at least one of an alkali metal, an alkaline earth metal, and zinc in an amount of at least 0.1 ppm by weight;
 a polymer having a statistical average of
  at least 4 acid groups per polymer chain,
  a ratio of carbon atoms per acid group of 7 to 35, and
  an acid number of 80 to 320 mg KOH/g, determined by potentiographic titration with 0.5 molar aqueous hydrochloric acid after heating in 0.5 molar ethanolic potassium hydroxide solution for three hours; and
 at least one additive selected from the group consisting of a detergent additive, a carrier oil, a cold flow improver, a lubricity improver, a corrosion inhibitor other than the polymer, a demulsifier, a dehazer, an antifoam, a cetane number improver, a combustion improver, an antioxidant, a stabilizer, an antistat, a metallocene, a metal deactivator, a dye and a solvent.

15. A method of inhibiting corrosion in a gasoline system, the method comprising:
 passing gasoline through a fuel system, wherein the gasoline comprises:
 at least one of an alkali metal, an alkaline earth metal, and zinc in an amount of at least 0.1 ppm by weight;
 a polymer having a statistical average of
  at least 4 acid groups per polymer chain,
  a ratio of carbon atoms per acid group of 7 to 35, and
  an acid number of 80 to 320 mg KOH/g, determined by potentiographic titration with 0.5 molar aqueous hydrochloric acid after heating in 0.5 molar ethanolic potassium hydroxide solution for three hours; and
 at least one additive selected from the group consisting of a lubricity improver, a corrosion inhibitor other than the polymer, a demulsifier, a dehazer, an antifoam, a combustion improver, an antioxidant, a stabilizer, an antistat, a metallocene, a metal deactivator, a dye, and a solvent.

* * * * *

UNITED STATES PATENT AND TRADEMARK OFFICE
CERTIFICATE OF CORRECTION

PATENT NO. : 10,240,100 B2
APPLICATION NO. : 15/115587
DATED : March 26, 2019
INVENTOR(S) : Jochen Mezger et al.

It is certified that error appears in the above-identified patent and that said Letters Patent is hereby corrected as shown below:

In the Specification

In Columns 10-11, Lines 67 and 1, delete "ethyl hexanoate," and insert -- ethylhexanoate, --.

Signed and Sealed this
Twenty-first Day of April, 2020

Andrei Iancu
*Director of the United States Patent and Trademark Office*